United States Patent [19]

Christopher

[11] Patent Number: 4,709,226

[45] Date of Patent: Nov. 24, 1987

[54] CIRCUITRY FOR COMPLEMENTING BINARY NUMBERS

[75] Inventor: Lauren A. Christopher, Hopewell, N.J.

[73] Assignee: RCA Corporation, Princeton, N.J.

[21] Appl. No.: 755,011

[22] Filed: Jul. 15, 1985

[51] Int. Cl.[4] ............................................ H03M 7/00
[52] U.S. Cl. .............................. 340/347 DD; 364/715
[58] Field of Search ................ 340/347 DD; 364/715, 364/736, 740, 768, 770, 787, 807, 716, 200

[56] References Cited

U.S. PATENT DOCUMENTS

| | | | |
|---|---|---|---|
| 3,949,299 | 4/1976 | Song | 325/38 B |
| 4,369,500 | 1/1983 | Fette | 364/758 |
| 4,417,315 | 11/1983 | Russell | 364/770 |
| 4,422,143 | 12/1983 | Guttag | 364/715 |
| 4,486,851 | 12/1984 | Christopher et al. | 364/770 |
| 4,520,347 | 5/1985 | Campbell, Jr. | 340/347 DD |

FOREIGN PATENT DOCUMENTS 53-20833 2/1978 Japan ..................................... 364/715

Primary Examiner—William M. Shoop, Jr.
Assistant Examiner—Richard K. Blum

Attorney, Agent, or Firm—Paul J. Rasmussen; Eric P. Herrmann; Kenneth N. Nigon

[57] ABSTRACT

Circuitry for forming the twos complement or ones complement of M-bit binary numbers is described. The circuitry includes M stages each of which contains an exclusive NOR gate. A first input terminal of the exclusive NOR gate is coupled to receive one bit of the input value and a second input terminal is coupled to receive the carry output signal from the previous stage. A logic one or logic zero is applied to the second input terminal of the stage which processes the least significant bit of the binary word if the circuitry is to provide a twos complement or ones complement value respectively. The carry output signal for each stage is generated by ANDing a logically inverted version of the input bit signal with the carry input signal applied to the stage. An application of the complementing circuitry in an absolute value circuit is also described. In this application, the carry input signal of each stage is ORed with a logically inverted version of the sign bit of the input value and the result is applied to the second input terminal of the explained NOR gate. This circuitry complements only negative values, passing positive values unchanged.

10 Claims, 8 Drawing Figures

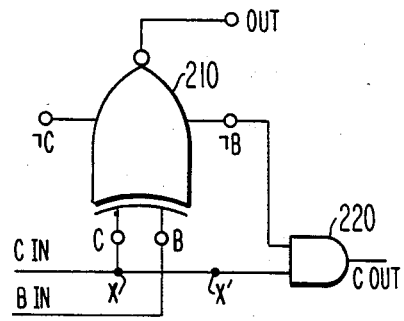
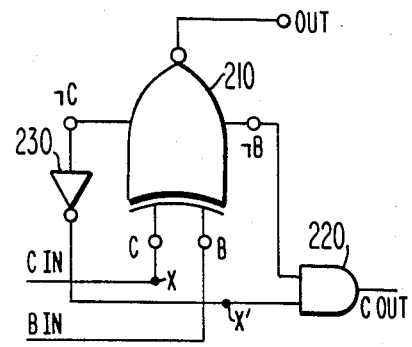
Fig. 2A
Fig. 2B
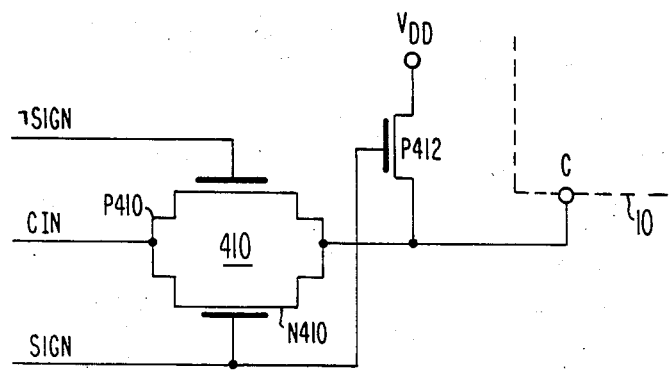
Fig. 4
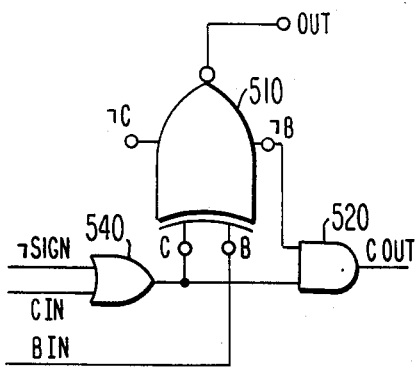
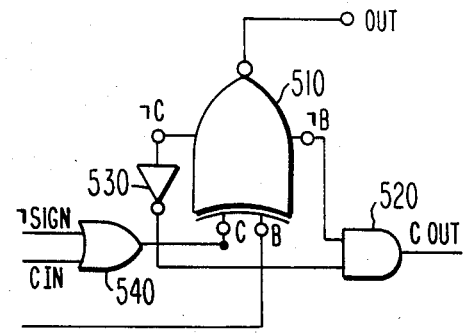
Fig. 5A
Fig. 5B

CIRCUITRY FOR COMPLEMENTING BINARY NUMBERS

This invention relates to apparatus for generating the arithmetic complements of binary values expressed in ones complement or twos complement notation.

The operation of complementing binary values, i.e. changing positive numbers to negative numbers and vice-versa, depends on how the binary values are represented. Three different systems for representing binary values are in general use: the sign-magnitude system, the ones complement system and the twos complement system.

In the sign-magnitude system, binary numbers are represented by an N-bit magnitude and a single sign bit. These numbers may be complemented by simply inverting the sign bit.

In ones complement notation the range of values which may be represented by an N-bit number is divided equally between positive and negative values. For positive numbers, the most significant bit (MSB) is zero and the $N-1$ less significant bits hold the conventional binary representation of the digital value. For negative numbers, however, the MSB is one and the $N-1$ less significant bits hold the bit-by-bit logical inverse of the conventional binary representation of the digital value. For example, in a 7-bit ones complement notational system, the digital value 56 is represented as 0111000 while $-56$ is 1000111. This system and the sign magnitude system are not widely used in digital signal processing, since, in each system, the digital value zero has two representations. This complicates any arithmetic computation because two cases must be provided for when one of the operands is zero.

The twos complement notational system has only one representation of zero and, so, is preferred for digital signal processing applications. Positive numbers in the twos complement system are identical to ones complement positive numbers. Negative numbers in the twos complement system are formed by inverting each bit of the corresponding positive number and adding 1. In the example presented above, $-56$ in twos complement notation is 1001000.

In the twos complement number system, there is one negative number which does not have a positive complement. This number has a one in the most significant bit position (sign bit) and zeros in all of the less significant bit positions. This number is its own complement. For example, in the 7-bit system set forth above, the number $-64$ is represented as 1000000. The twos complement of this number is also 1000000. For digital signal processing, this anomaly is less serious than the dual representation of zero in the sign-magnitude and ones complement systems since the largest negative number occurs less frequently than the number zero. Accordingly, this value may be detected and handled (e.g. as an overflow condition) with a relatively small amount of computational overhead.

The twos complement function is conventionally realized using an N-bit inverter and a dedicated adder or incrementing circuit. The inverter changes all of the ones in an N-bit binary value to zeros and all of the zeros to ones. The adder or incrementer then increases the inverted binary value by one to form the complement of the original N-bit value.

An absolute value circuit is a particular application of a complementing circuit. In an absolute value circuit, only negative numbers are complemented, positive numbers are passed unmodified. If an absolute value circuit is implemented using a conventional twos complement circuit, extra circuitry may be needed to bypass the inversion and addition steps for positive numbers.

SUMMARY OF THE INVENTION

The present invention is circuitry for developing the complement of binary numbers represented in twos complement or ones complement notation. The circuitry includes a plurality of stages, one for each bit in the magnitude portion of the binary value and one for the sign bit. Each of the stages includes an exclusive NOR (XNOR) gate having one input terminal coupled to receive one bit of the binary value to be complemented and a second input connected to receive a carry signal. The carry signal applied to each stage is generated by the stage which processes the next less significant bit. Each of the magnitude stages generates a carry output signal by combining the carry input signal applied to the stage and an inverted version of the binary bit applied to the stage.

BRIEF DESCRIPTION OF THE DRAWINGS

FIGS. 2A and 2B are logic schematic diagrams showing combinatorial logic that is functionally equivalent to the circuitry shown in FIG. 1.

FIG. 4 is a circuit schematic diagram, which, with FIG. 1, shows exemplary circuitry to process one bit in a binary absolute value circuit embodying the present invention.

FIGS. 5A and 5B are logic schematic diagrams showing combinatorial logic equivalent to the circuitry shown in FIGS. 1 and 4.

DETAILED DESCRIPTION

As set forth above, an N-bit twos complement number may be complemented by inverting each bit and incrementing the inverted value by one. The increment operation may be performed by adding a one to the LSB of the inverted value and then propagating a carry signal through the $N-1$ more significant bits of the value. A truth table for a single stage of this complementer is set forth below in TABLE I. The signal BIN is the binary input value, the signal CIN is the carry input to the stage, the signal ¬BIN is the inverted binary input value and the signal COUT is the carry output of the stage (i.e. the carry input signal for the stage which process the next more significant bit of the binary value).

TABLE I

| BIN | ¬BIN | CIN | OUT = ¬BIN + CIN | COUT |
|-----|------|-----|------------------|------|
| 0   | 1    | 0   | 1                | 0    |
| 0   | 1    | 1   | 0                | 1    |
| 1   | 0    | 0   | 0                | 0    |
| 1   | 0    | 1   | 1                | 0    |

In the present invention, the inversion of BIN and the addition of ¬BIN and CIN are both performed by an XNOR gate and the COUT signal is obtained by ANDing ¬BIN and CIN. A truth table for this circuitry is shown in TABLE II.

TABLE II

| BIN | CIN | OUT = BIN XNOR CIN | COUT = ¬BIN AND CIN |
|-----|-----|---------------------|----------------------|
| 0   | 0   | 1                   | 0                    |
| 0   | 1   | 0                   | 1                    |
| 1   | 0   | 0                   | 0                    |
| 1   | 1   | 1                   | 0                    |

The OUT and COUT columns of this truth table are identical to those of TABLE I.

Figure 1:
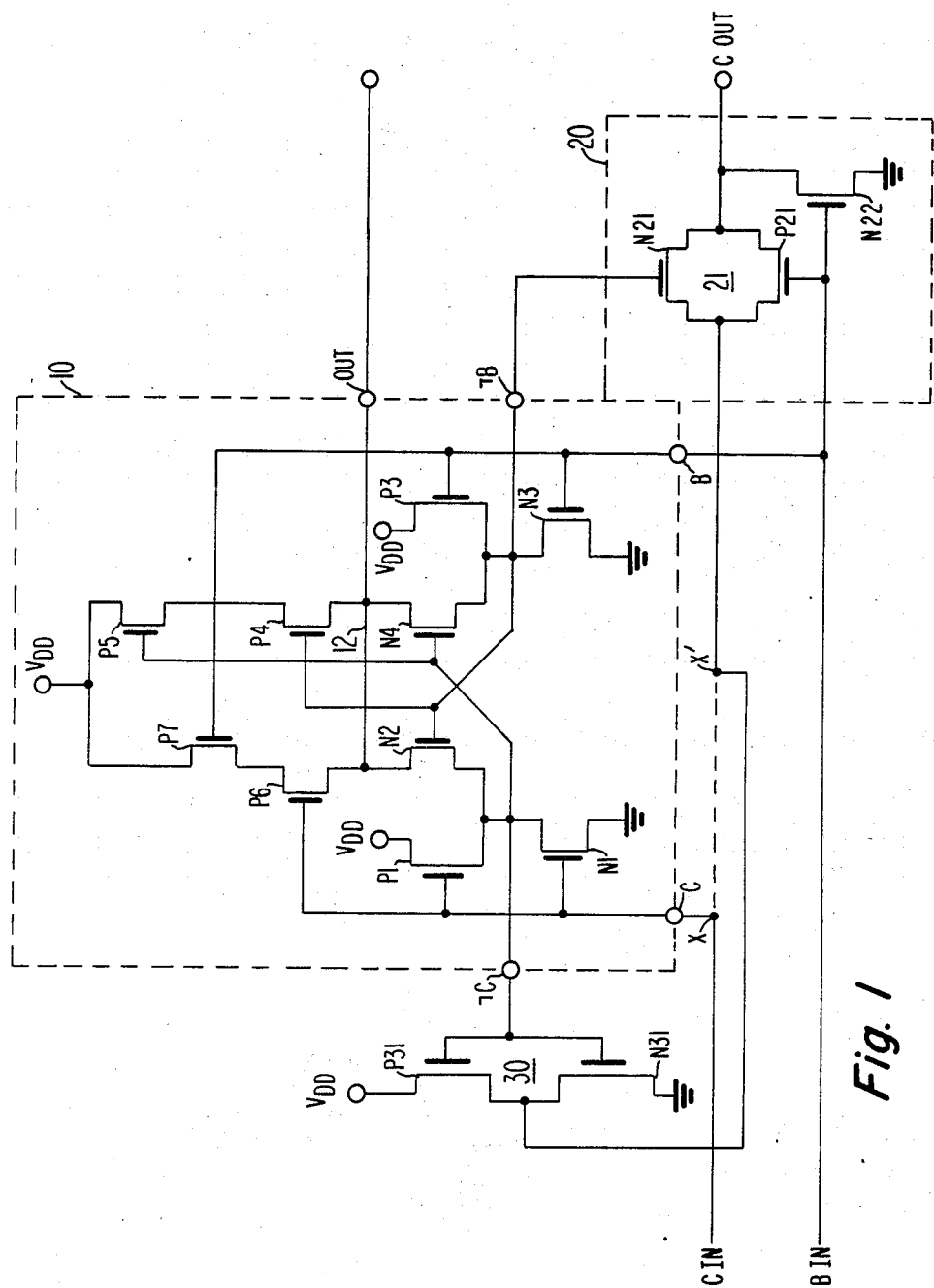
FIG. 1 is a circuit schematic diagram of exemplary circuitry which may process one bit in an N-bit binary complementing circuit embodying the present invention.

The circuitry shown in FIG. 1 includes a complementary metal-oxide-semiconductor (CMOS) XNOR gate 10, a transmission gate 20 and an optional inverter 30. This circuitry forms one stage of a complementing circuit which embodies the present invention. A complementer which processes N-bit numbers uses N of these stages as explained below in reference to FIG. 3. One bit of the binary value to be complemented is applied as signal BIN to the B input terminal of XNOR gate 10. The carry signal generated by the stage which processes the next less significant bit of the binary value is applied as the signal CIN to the input terminal C of XNOR gate 10.

The signal CIN is applied to the gate electrode of a P-channel metal-oxide-semiconductor (MOS) transistor $P_1$ and an N-channel MOS transistor $N_l$. The source electrode of transistor $P_l$ is connected to a source of relatively positive operating potential, $V_{DD}$. The drain electrode of $P_l$ is connected to the drain terminal of transistor $N_l$ and the source electrode of $N_l$ is connected to a source of relatively negative operating potential, e.g. ground. In this configuration, transistors $P_1$ and $N_1$ form a CMOS inverter; the input signal is applied to the interconnected gate electrodes of the two transistors and the inverted output signal is available at the interconnected drain electrodes of $P_1$ and $N_1$. The interconnected drain electrodes of transistors $P_1$ and $N_1$ are connected to the output electrode ¬C of XNOR gate 10.

Signal BIN is applied to the interconnected gate electrodes of a P-channel MOS transistor $P_3$ and an N-channel MOS transistor $N_3$. The source electrode of transistor $P_3$ is connected to operating supply $V_{DD}$ and the drain electrode of transistor $P_3$ is connected to the drain electrode of transistor $N_3$. The source electrode of transistor $N_3$ is connected to ground. Transistors $P_3$ and $N_3$ operate as an inverter to invert the signal BIN. The inverted BIN signal is available at the output terminal ¬B of XNOR gate 10. This inverted BIN signal is applied to the gate electrode of an N-channel MOS transistor $N_2$.

The source electrode of transistor $N_2$ is connected to the drain electrodes of transistors $P_1$ and $N_1$ and the drain electrode of transistor $N_2$ is coupled to the supply $V_{DD}$ through a pass transistor network which includes the P-channel MOS transistors $P_4$, $P_5$, $P_6$ and $P_7$. Regarding, for the moment, the transistors $P_4$ through $P_7$ as a pull up network, transistors $N_1$ and $N_2$ act together as a NAND gate having an output at connection 12. The NAND function is performed on the CIN input signal applied to the gate of transistor $N_1$ and the inverted BIN signal coupled to the gate of transistor $N_2$.

A similar NAND gate structure is formed by the N-channel transistors $N_3$ and $N_4$. The inverted CIN signal developed at the common drain electrodes of transistors $P_1$ and $N_1$ is applied to the gate electrode of transistor $N_4$. The source electrode of $N_4$ is connected to the drain electrodes of transistors $N_3$ and $P_3$ and the drain of $N_4$ is connected by connection 12 to the pass transistor network formed by transistors $P_4$ through $P_7$. The output of this gate structure, at connection 12, is the logical NAND of BIN and the inverted CIN. The drain electrodes of the transistors $N_2$ and $N_4$ are connected by connection 12 to the output terminal OUT of the XNOR gate 10. The connection 12 forms the logical AND of the signals at the drain electrodes of transistors $N_2$ and $N_4$. Accordingly, the signal available at terminal OUT of XNOR gate 10 may be expressed as ¬(¬BIN • CIN) • ¬(BIN • ¬ CIN ) where "¬" indicates the logical inversion operator and " • " the logical AND operator. This expression is equivalent to A XNOR B.

In the present embodiment, a logic one is a positive potential relative to ground. This potential is applied to connection 12 through the pass transistor network which includes the P-channel transistors $P_4$, $P_5$, $P_6$ and $P_7$. The inverted CIN signal from the common drain electrodes of transistors $P_1$ and $N_1$ is applied to the gate electrode of transistor $P_5$ and the inverted BIN signal from the common drain electrodes of transistors $P_3$ and $N_3$ is applied to the gate electrode of transistor $P_4$. The source electrode of transistor $P_5$ is connected to the suppl $V_{DD}$ and the drain electrode of transistor $P_5$ is connected to the source electrode of transistor $P_4$. The drain of $P_4$ is connected to the conductor 12. The transistors $P_4$ and $P_5$ form a pass transistor gate which passes a positive potential, from supply $V_{DD}$, to the interconnected drain terminals of transistors $N_2$ and $N_4$ only when both BIN and CIN are in a logic one state.

The series connected transistors $P_6$ and $P_7$ form a second pass transistor gate which is connected in parallel with pass transistor gate containing $P_4$ and $P_5$. The gate electrodes of $P_6$ and $P_7$ are connected respectively to the input terminals C and B of the XNOR gate 10. Accordingly, $P_6$ and $P_7$ pass a positive potential from suppl $V_{DD}$ to conductor 12 only when both BIN and CIN are in a logic zero state.

The pass transistor network applies a positive potential to pull up the output of the XNOR gate only when the output signal should be a logic one. Accordingly, the static power consumption of the XNOR gate is approximately zero.

It is contemplated, however, that other types of pull up networks may be used. For example, a depletion mode N-channel MOS transistor (not shown) having its drain electrode coupled to terminal $V_{DD}$ and its gate and source electrodes coupled to conductor 12 may replace all of the transistors $P_4$ through $P_7$.

The carry output signal, COUT, is developed as follows. The signal BIN and the inverted version of signal BIN from terminal ¬B are applied to the respective gate electrodes of the parallel connected complementary transistors $P_{21}$ and $N_{21}$. Signal CIN is coupled to one of the drain/source interconnections of the transistors $P_{21}$ and $N_{21}$ and the output signal, COUT, is available at the other drain/source interconnection.

The signal COUT is the logical AND of the signal CIN and the inverse of the signal BIN. When BIN is one, both $N_{21}$ and $P_{21}$ are in a nonconducting state. Accordingly, the carry output signal is a logic zero. When BIN is zero, however, both $N_{21}$ and $P_{21}$ conduct. In this instance, the carry input signal CIN is transmitted to form the carry output signal COUT. A further N-channel transistor, N22, having its gate electrode coupled to BIN is coupled between COUT and ground to pull COUT to zero when the transistors $P_{21}$ and $N_{21}$ are rendered nonconductive. The transmitted signal CIN is subject to resistive losses through the transistors $N_{21}$ and $P_{21}$. If the CIN signal were applied directly to the AND gates 20 through several successive bit stages of this complementing circuit, these resistive losses may accumulate, reducing the amplitude of logic ones to below the threshold needed to drive succeeding the XNOR gate 10. This configuration of a single stage which passes the carry signals is represented by the phantom connection between terminals x and x'. To prevent degradation of the carry signal, an alternative configuration of the basic circuit buffers the CIN signal through an inverter in XNOR gate 10 (transistors $P_1$ and $N_1$) and through an inverter 30. Inverter 30 includes a P-channel MOS transistor $P_{31}$ and an N-channel MOS transistor $N_{31}$. The gate electrodes of $P_{31}$ and $N_{31}$ are connected to the ¬C output terminal of XNOR gate 10. The source electrode of transistor $N_{31}$ is connected to the supply $V_{DD}$ and the drain electrode of $P_{31}$ is connected to the drain electrode of $N_{31}$. The source electrode of transistor $N_{31}$ is connected to ground.

The inverted CIN signal available at terminal ¬C, as set forth above, is itself inverted by inverter 30. This doubly inverted signal, available at the interconnected drain terminals of the transistors $P_{31}$ and $N_{31}$, is applied to the terminal x' in place of the CIN signal from terminal x. In the present embodiment, one stage which buffers signal CIN is used for every three stages which pass CIN directly from the COUT terminal of the preceding state. The relative placement of buffered and unbuffered stages depends on the circuitry and processes which are used to realize the invention. One skilled in the art would know where to place buffered stages in a particular apparatus.

FIG. 2A is a schematic diagram of the logic equivalent to an unbuffered stage and FIG. 2B is a schematic diagram of the logic equivalent to a buffered stage of the circuit shown in FIG. 1. In both of these circuits, the signals BIN and CIN are applied to the respective input terminals B and C of an XNOR gate 210, the output signal of which is available at terminal OUT. The XNOR gate 210 also provides, at its output terminals ¬B and ¬C, inverted versions of the respective BIN and CIN signals. In FIG. 2A, the carry input signal, CIN, is coupled directly to one input terminal of the AND gate 220 while in FIG. 2B, the inverted CIN signal from terminal ¬C of XNOR gate 210 is coupled to inverter 230 which provides a buffered CIN signal to AND gate 220. In both circuits, the inverted BIN signal from the output terminal ¬B of XNOR gate 210 is applied to the second input terminal of AND gate 220. The gate 220 provides the carry output signal, COUT. This signal is the carry input signal to the stage which processes the next more significant bit.

Figure 3:
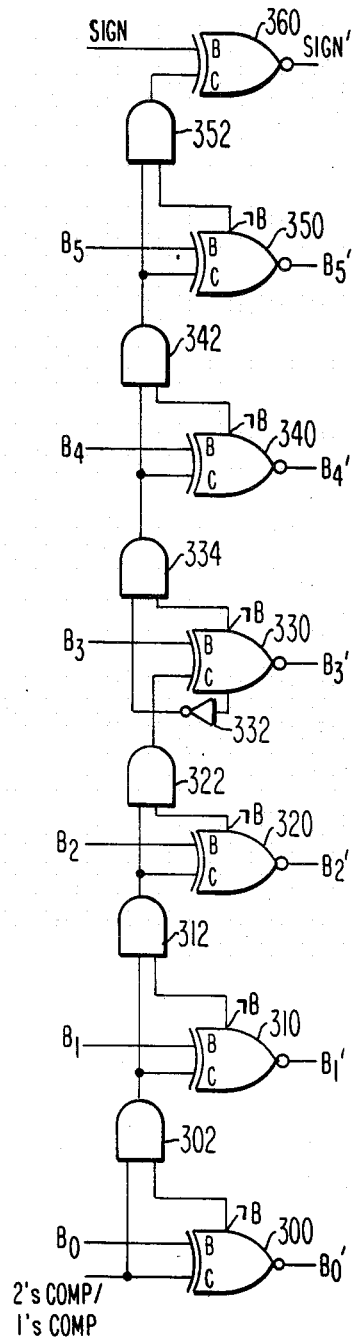
FIG. 3 is a logic schematic diagram of a 7-bit complementing circuit embodying the present invention.

FIG. 3 illustrates a combination of seven of the stages illustrated in FIGS. 2A and 2B to form a 7-bit complementing circuit. This circuit may be used to complement numbers that are represented in either ones complement or twos complement notation as explained below.

The MSB, or sign bit, of the binary value is applied as signal SIGN to the B input terminal of XNOR gate 360 and the six decreasingly significant bits ($B_5$ through $B_0$) are applied to the B input terminals of the XNOR gates 350, 340, 330, 320, 310 and 300 respectively. The signal applied to the C input terminal of XNOR 300 is a logic one or a logic zero depending on whether the binary values to be complemented are in twos complement notation or ones complement notation respectively. XNOR gate 300 provides an output signal, $B_0'$, which is the first bit or LSB of the complemented binary values provided by the circuit. The signal applied to the C input terminal of gate 300 and the inverted $B_0$ signal from the output terminal ¬B of gate 300 are applied to AND gate 302 which produces the carry output signal of the first stage. This signal is applied to the C input terminal of XNOR gate 310. The second bit of the input binary values, $B_1$, is applied to the input terminal B of XNOR 310. The signal, $B_1'$, provided by XNOR gate 310 is the second bit of the complemented binary value.

The carry signal from AND gate 302 and the inverted $B_1$ signal from the output terminal ¬B of XNOR gate 310 are applied to AND gate 312 which generates the carry output signal for the second stage of the complementing circuit.

The XNOR gate 320 and AND gate 322 perform identically to the gates 310 and 312 respectively. Gate 320 provides the third bit of the complemented binary value, $B_2'$, by adding the inverted bit $B_2$ to the carry signal provided by gate 312. Gate 322 provides a carry output signal which is the logical AND of the inverted $B_2$ signal provided by XNOR 310 and the carry signal provided by AND gate 312.

As set forth above, one stage of every four stages in the present complementing circuit provides a carry signal with restored logic levels by buffering the carry input signal through two inverters. The fourth stage of the present complementing circuit which includes XNOR gate 330, inverter 332 and AND gate 334 is one of these buffering stages. This fourth stage is logically equivalent to any of the unbuffered first, second or third stages. The XNOR gate 330 provides a signal $B_3'$ which is the fourth bit of the complemented binary value, and the AND gate 334 provides a carry signal to the fifth stage of the complementing circuit. As set forth above in reference to FIG. 2B, the carry input signal applied to AND gate 334 is developed by applying the inverted carry signal available at the output terminal ¬C of XNOR gate 330 to the inverter 332. The signal provided by inverter 332 is applied as the carry input signal to the AND gate 334.

The fifth stage of the complementing circuit, which includes XNOR gate 340 and AND gate 342, and the sixth stage, which includes XNOR gate 350 and AND gate 352, are both unbuffered stages, identical to the first stage described above. The fifth stage generates a signal $B_4'$, the fifth bit of the complemented binary values, and a carry signal for the sixth stage from the inverted $B_4$ signal and the carry signal provided by the fourth stage. Similarly, the sixth stage generates a complemented signal $B_5'$ and a carry signal for the seventh, or sign bit stage, from the inverted $B_5$ signal and the carry signal provided by the fifth stage.

The seventh stage of the complementing circuit develops the sign bit of the complemented binary value. In the present embodiment, this stage is a single XNOR gate 360 which combines the MSB of the uncomplemented binary value with the carry signal generated by the sixth stage to generate the signal SIGN' which is the MSB of the complemented binary value.

As set forth above, the circuit shown in FIG. 3 may be used to develop the arithmetic complements of values expressed in either twos complement or ones complement notation by applying a logic one or a logic zero respectively to the input terminal C of XNOR gate 300. As explained above in reference to tables 1 and 2, each stage of the complementing circuit inverts the binary bit signal applied to its B input terminal, adds to this inverted signal the carry signal applied to its C input terminal and generates a carry signal for application to the stage which processes the next more significant binary list signal. Consequently, when a zero is applied to the input terminal C of XNOR gate 300, a zero is added to the bit-by-bit inverted binary values and the complementing circuit complements input values in ones complement notation. When a one is applied to terminal C of gate 300, however, a one is added to the bit-by-bit inverted binary values and the complementing circuit complements input values in twos complement notation.

One application of the complementing circuit described above is in an absolute value circuit. An absolute value circuit complements negative numbers but passes positive numbers unchanged. FIG. 4 is a schematic diagram of circuitry which, when added to the circuitry shown in FIG. 1 converts the complementing stage into a stage which may be used to develop the absolute values of either ones complement or twos complement binary numbers. In FIG. 4, a transmission gate 410 includes an N-channel MOS transistor N410 and a P-channel transistor P410 connected in parallel. The carry input signal CIN is coupled to one of drain/source connections of the transistors N410 and P410. The other drain/source connection of transistors N410 and P410 is connected to the input terminal C of XNOR gate 10. The signals SIGN and ¬SIGN are applied to the gate electrodes of transistors N410 and P410 respectively. The signal SIGN is the MSB of the input binary values and signal ¬SIGN is its logical inverse. The signal SIGN is also applied to the gate electrode of a pull up transistor P412. The source and drain electrodes of transistor P412 are connected, respectively, to the operating supply $V_{DD}$ and to the input terminal C of XNOR gate 10. In this configuration, the transmission gate 410 and pull-up transistor P412 provide a signal which is the logical OR of the SIGN and CIN signals.

FIGS. 5A and 5B are, respectively, logic schematic diagrams of unbuffered and buffered stages for an absolute value circuit. For negative numbers (SIGN=1), the XNOR gates 510, AND gates 520 and inverter 530 perform the same functions in the complementing circuitry described above. In this instance, the ¬SIGN signal applied to one input terminal of OR gate 540 is a logic zero, so the output signal provided by the gate 540 is the same as the CIN signal applied to its other input terminal. However, when the SIGN signal is a logic zero, ¬SIGN is a logic one and the OR gate 540 provides a logic one output signal irrespective of value of signal CIN. This logic one signal is applied to the C input terminal of the XNOR gates 510, causing the XNOR gate to provide an output signal that is the same as the BIN signal applied to its input terminal B.

Since the OR gates 540 shown in FIGS. 5A and 5B includes transmission gates, the carry signals passed through the gates 540 may be subject to resistive losses similar to those described above in reference to the AND gates 220 of FIGS. 2A and 2B. In the present embodiment, these additional resistive losses do not require additional buffering of the carry signal. Buffering this signal through one stage out of four is sufficient to prevent errors in the values provided by the absolute value circuit which may result from the accumulation of these resistive losses.

Figure 6:
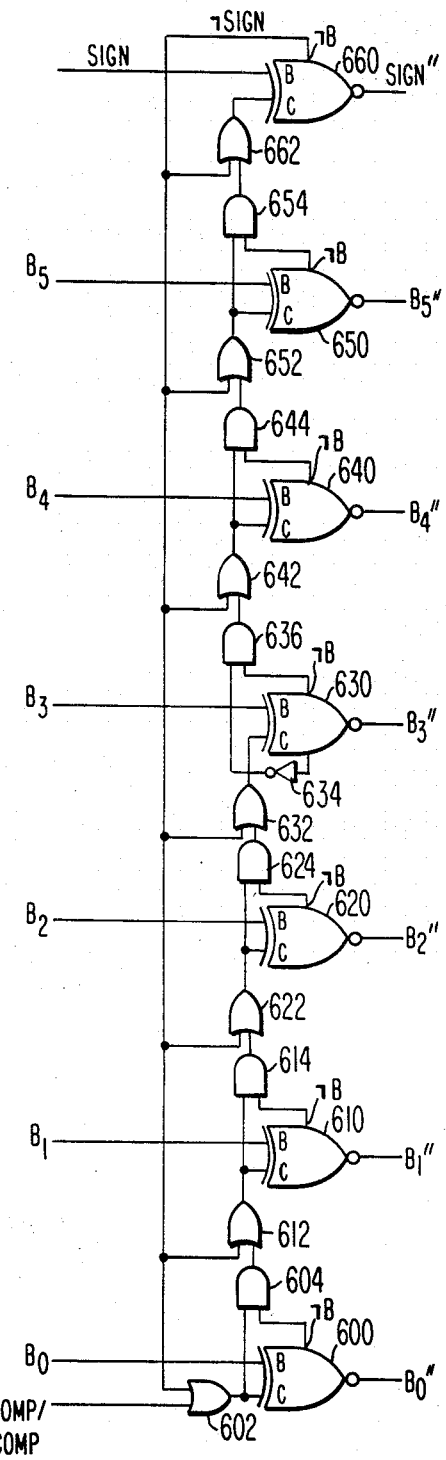
FIG. 6 is a logic schematic diagram of a 7-bit absolute value circuit embodying the present invention.

FIG. 6 is a block diagram of a 7-bit absolute value circuit. The XNOR gates and AND gates used in this circuit each corresponds to an XNOR gate or an AND gate in the circuit shown in FIG. 3. Similarly, the inverter 634 in FIG. 6 corresponds to the inverter 332 of FIG. 3. Additionally, the absolute value circuit includes seven OR gates. The signal SIGN is applied to the input terminal B of XNOR gate 660. An inverted version of this signal, ¬SIGN, is available at the output terminal 7B of gate 660. The ¬SIGN signal is applied to one input terminal of each of the OR gates 602, 612, 622, 632, 642, 652 and 662. The carry signals from the twos complement/ones complement selection terminal, and the carry output signals developed by the AND gates 604, 614, 624, 636, 644 and 654 are applied to the second input terminals of the respective OR gates. The OR gates 602, 612, 622, 632, 642, 652 and 662 selectively transmit carry signals for application to the C input terminals of the XNOR gates 600, 610, 620, 630, 640, 650 and 660 respectively.

When the sign bit of the values applied to the absolute value circuit is a logic one, the ¬SIGN signal applied to the first input terminal of each of the OR gates is a logic zero. Consequently, the signal provided by each of the OR gates is the same as the carry signal applied to its second input terminal. In this mode, the circuit performs the same function as the complementing circuit shwon in FIG. 3. However, when the values applied to the absolute value circuit have a zero sign bit, ¬SIGN is a logic one and each of the OR gates applies a logic one to its associated XNOR gate. In this mode, each XNOR gate is conditioned to pass the signal applied to its B input terminal unchanged. Accordingly, the absolute value circuit does not complement positive numbers.

It is contemplated that the circuitry shown in FIG. 6 may be modified to complement only positive numbers by applying the signal SIGN in place of signal ¬SIGN to the OR gates 602, 612, 622, 632, 642, 652 and 662. Furthermore, it is contemplated that the circuit may be used as a selective complementer if, instead of signal SIGN, an external signal is applied to the respective input terminals of the aforementioned OR gates. The binary input values are complemented when this signal is zero and not complementsd when it is one.

While 7-bit complementing and absolute value circuits have been described it is contemplated that circuits which act on any number of bits can be built by a logical extension of the circuitry described above. It is further contemplated that the absolute value circuitry described above may be easily modified to convert numbers represented in the sign-magnitude system to either twos complement or ones complement numbers. To modify the circuitry shown in FIG. 6, for example, AND gate 654, XNOR gate 660 and OR gate 662 are deleted. The output signal SIGN" is taken directly from the input signal SIGN and an inverter (not shown) is coupled to the input signal SIGN to develop the signal ¬SIGN which is applied to the OR gates 602, 612, 622, 632, 642 and 652.

What is claimed is:

1. Apparatus having N stages, N being a positive integer, for developing the arithmetic complement of binary values having N bits, each of said values having a sign bit which represents the polarity of the value, wherein one stage of said apparatus comprises:

a data input terminal for applying signals representing one bit of said binary values;

a data output terminal for providing signals representing the corresponding bit of said complemented binary values;

a carry input terminal for applying carry input signals to said stage;

a carry output terminal for providing carry output signals from said stage;

first combinatorial logic circuitry having a first input electrode coupled to said data input terminal, a second input electrode coupled to said carry input terminal and an output electrode coupled to said data output terminal, the output function of said first logic circuitry being characterized by the logical exclusive NOR operation on said carry input signals and the signals applied to said data input terminal; and second combinatorial logic circuitry having a first input electrode coupled to said data input terminal, a second input electrode coupled to said carry input terminal and an output electrode coupled to said carry output terminal, the output function of said second logic circuitry being characterized by the logical AND operation on said carry input signals and logically inverted versions of the signals applied to said data input terminal.

2. The apparatus set forth in claim 1 wherein:

said first combinatorial logic circuitry includes signal inversion means, coupled to said data input terminal for developing logically inverted versions of the signals applied thereto; and said second combinatorial logic circuitry includes circuitry coupled to said signal inversion means and to said carry input terminal for developing output signals representing the logical AND operation applied to said carry input signals and the signals provided by said signal inversion means.

3. The apparatus set forth in claim 1 wherein said one bit is the least significant bit of said binary values, further comprising mode controlling means including means for applying a logic one as said carry input signal to condition the apparatus to develop the arithmetic complement of binary numbers as represented in twos complement notation.

4. The apparatus set forth in claim 3 including a further stage comprising:

a data input terminal for applying signals representing another bit of said binary values to said further stage;

a data output terminal for providing signals representing the corresponding bit of said complemented binary values;

a carry input terminal for applying carry input signals to said further stage;

a carry output terminal for providing carry output signals from said further stage;

third combinatorial logic circuitry having first, second and third electrodes coupled to the respective data input terminal, carry input terminal and data output terminal of said further stage, the output function of said third logic circuitry being characterized by the logical exclusive NOR operation on the respective signals applied to the data input terminal and carry input terminal of said further stage;

fourth combinatorial logic circuitry having first and second input electrodes coupled to the respective data input terminal and carry input terminal of said further stage and an output electrode coupled to the carry output terminal of said further stage, the output function of said fourth logic circuitry being characterized by the logical AND operation on the carry input signals applied to said further stage and logically inverted versions of the signals applied to the data input terminal of said further stage; and means coupled between the carry output terminal of said one stage and the carry input terminal of said further stage for propagating the carry output signal provided by said one stage to the carry input terminal of said further stage.

5. The apparatus set forth in claim 4 wherein said carry propagation means comprises:

fifth combinatorial logic circuitry having first and second input electrodes coupled to the carry output signal provided by said one stage and a signal representing the sign bit of said binary values respectively, and an output electrode coupled to the carry input terminal of said further stage, for conditioning said apparatus to complement the values applied thereto when said sign bit signal is in a first predetermined state and to pass the values uncomplemented when said sign bit signal is in a second state.

6. The apparatus set forth in claim 5 wherein said fifth combinatorial logic circuitry comprises:

means coupled to receive the sign bit of said binary values for developing a logically inverted version thereof;

means coupled to the carry output terminal of said one stage and to said sign bit inverting means for developing a signal at the output electrode of said fifth combinatorial logic circuitry which is the logical OR of the carry output signal provided by said one stage and the inverted sign bit signal provided by said inverting means to condition said further stage to complement the signal applied to the data input terminal of said further stage when said sign bit is in a logic one state and to pass the signal applied to the data input of said further stage uncomplemented when said bit is in a logic zero state.

7. The apparatus set forth in claim 1 wherein said first combinatorial logic circuitry includes:

a first inverter coupled to said data input terminal for developing signals representing the logical inverse of the signals applied thereto;

a second inverter coupled to said carry input terminal for developing signals representing the logical inverse of the signals applied thereto;

first means coupled to said first and second inverters for developing output signals representing the logical NAND of the carry input signals and the signals provided by said first inverter;

second means coupled to said first and second inverters for developing output signals representing the logical NAND of the signals applied to said data input terminal and the signals provided by said second inverter;

third means coupled to said first and second means for developing signals representing the logical AND of the signals developed by said first and second means.

8. The apparatus set forth in claim 7 including first and second supply terminals for applying respective first and second supply potentials wherein:

said first inverter includes first and second field effect transistors of respective first and second mutually complementary conductivity types having respective control electrodes and respective first and second electrodes defining respective principal conduction paths, said principal conduction path of said first transistor being coupled between said first supply terminal and a first node, said principal conduction path of said second transistor being coupled between said first node and said second supply terminal and the control electrodes of said first and second transistors being connected in common to said carry input terminal;

said second inverter includes third and fourth field effect transistors of respective first and second conductivity types having respective control electrodes and respective first and second electrodes defining respective principal conduction paths, said principal conduction path of said third transistor being coupled between said first supply terminal and a second node, said principal conduction path of said fourth transistor being coupled between said second node and said second supply terminal and the control electrodes of said third and fourth transistors being connected in common to said data input terminal;

said first means includes a fifth field effect transistor of said second conductivity type having a control electrode and first and second electrodes defining a principal conduction path, said control electrode of said fifth transistor being coupled to said first node and said first and second electrodes of said fifth transistor being coupled between said second node and a third node;

said second means includes a sixth field effect transistor of said second conductivity type having a control electrode and first and second electrodes defining a principal conduction path, said control electrode of said sixth transistor being coupled to said second node and said first and second electrodes of said sixth transistor being coupled between said first node and a fourth node; and said third means includes means for connecting said third and fourth nodes and seventh, eighth, ninth and tenth transistors of said first conductivity type having respective control electrodes and respective first and second electrodes defining respective principal conduction paths, said seventh and eighth transistors having serially connected conduction paths coupled between said first supply terminal and said third node and control electrodes coupled respectively to said second and first nodes, said ninth and tenth transistors having serially connected conduction paths coupled between said first supply terminal and said fourth node and control electrodes coupled respectively to said carry input and data input terminals.

9. The apparatus set forth in claim 8 wherein said second combinatorial logic circuitry includes a transmission gate having a control electrode and input and output electrodes defining a selectively controlled conduction path, the control and input electrodes of said transmission gate being coupled to said second node and to said carry input terminal respectively.

10. The apparatus set forth in claim 9 further comprising means for developing a buffered carry signal for application to said second combinatorial logic circuitry including eleventh and twelfth field effect transistors of first and second conductivity types respectively, having respective control electrodes and respective first and second electrodes defining respective principal conduction paths, said control electrodes of said eleventh and twelfth transistors being connected in common to said first node, the first electrodes of said eleventh and twelfth transistors being coupled to said first supply terminal and to said second supply terminal respectively and the second electrodes of said eleventh and twelfth transistors being connected in common to the input electrode of said transmission gate.

* * * * *

UNITED STATES PATENT AND TRADEMARK OFFICE
CERTIFICATE OF CORRECTION

PATENT NO. : 4,709,226

DATED : November 24, 1987

INVENTOR(S) : Lauren A. Christopher

It is certified that error appears in the above-identified patent and that said Letters Patent is hereby corrected as shown below:

Column 4, Line 28   -   "suppl" should read -- supply -- ;

Column 7, Line 43   -   before "SIGN" insert -- ⌐ -- ;

Column 7, Line 54   -   before "SIGN" insert -- ⌐ -- ; and

Column 8, Line 44   -   before "SIGN" insert -- ⌐ -- .

Signed and Sealed this

Sixteenth Day of August, 1988

Attest:

DONALD J. QUIGG

*Attesting Officer*   *Commissioner of Patents and Trademarks*

Disclaimer 4,709,226.—*Lauren A. Christopher*, Hopewell, N.J. CIRCUITRY FOR COMPLEMENTING BINARY NUMBERS. Patent dated Nov. 24, 1987. Disclaimer filed May 18, 1990, by the assignee, RCA Licensing Corporation.

Hereby enters this disclaimer to claims 1 through 4 of said patent.
[ *Official Gazette August 14, 1990* ]